US006206034B1

(12) United States Patent
McHugh

(10) Patent No.: US 6,206,034 B1
(45) Date of Patent: Mar. 27, 2001

(54) VALVE WITH INTEGRAL FLOW SWITCH

(75) Inventor: George J. McHugh, Broomall, PA (US)

(73) Assignee: AGF Manufacturing, Inc., Melvern, PA (US)

( * ) Notice: Subject to any disclaimer, the term of this patent is extended or adjusted under 35 U.S.C. 154(b) by 0 days.

(21) Appl. No.: 09/377,177

(22) Filed: Aug. 19, 1999

(51) Int. Cl.$^7$ .................................................. F16K 37/00
(52) U.S. Cl. ..................... 137/559; 137/552; 137/601.16; 137/601.17; 251/305; 251/315.01
(58) Field of Search ................................... 137/559, 552, 137/599.01, 601.16, 601.17; 251/305, 315.01, 315.16

(56) References Cited

U.S. PATENT DOCUMENTS

| | | |
|---|---|---|
| 350,510 | 10/1886 | Stretch . |
| 421,224 | 2/1890 | Applegarth . |
| 899,201 | 9/1908 | Braybrook . |
| 926,774 | 7/1909 | Schmidt . |
| 1,017,292 | 2/1912 | Hyde . |
| 1,023,104 | 4/1912 | Carpenter . |
| 1,056,344 | 3/1913 | Lester . |
| 1,229,038 | 6/1917 | Cornelius . |
| 1,264,775 | 4/1918 | Coles . |
| 1,333,048 | 3/1920 | Webster . |
| 1,428,744 | 9/1922 | Bastian et al. . |
| 1,666,918 | 4/1928 | Scoville . |
| 1,757,237 | 5/1930 | Deutsch . |
| 1,808,092 | 6/1931 | Wimmer . |
| 1,825,512 | 9/1931 | Durham et al. . |
| 2,014,042 | 9/1935 | Fox . |
| 2,108,272 | 2/1938 | Seyfarth . |
| 2,140,292 | 12/1938 | Jensen . |
| 2,209,397 | 7/1940 | Gannestad . |
| 2,347,830 | 5/1944 | Kiburz et al. . |
| 2,491,361 | 12/1949 | Burdick . |
| 2,621,012 | 12/1952 | Graham . |

(List continued on next page.)

FOREIGN PATENT DOCUMENTS

| | | |
|---|---|---|
| 963446 | 2/1975 | (CA) . |
| 42304 | 8/1908 | (CH) . |
| 110371 | 6/1925 | (CH) . |
| 181505 | 6/1922 | (GB) . |

OTHER PUBLICATIONS

Brochure from Triple "R" Specialty Co. dated Nov. 1986.
Brochure from Fire Sprinkler Fittings Co. dated Aug. 1986.
Brochure for Model 3011–BV Inspectors Test Ball Valve, AGF Mfg. Co., Inc.
Brochure from Victaulic dated Jun. 1986.
Brochure from Sunbelt Marketing, Inc. dated Apr. 15, 1986.
Standard for the Installation of Sprinkler Systems, NFPA 13, 1983 Ed., pp. 13–135.
1–708–W Series 708–W Butterfly Valve with Weatherproof Actuator, Victaulic Company of America.
1000 Series Compact Flow Switch, KIP.

*Primary Examiner*—Kevin Lee
(74) *Attorney, Agent, or Firm*—Burns, Doane, Swecker & Mathis, LLP

(57) ABSTRACT

A valve has an integral flow switch with a passageway provided through the valve member such as a butterfly disk to an inlet of the flow switch. An outlet of the flow switch communicates with the outlet of the valve.

29 Claims, 4 Drawing Sheets

U.S. PATENT DOCUMENTS

| | | |
|---|---|---|
| 2,660,560 | 11/1953 | Pickard . |
| 2,859,611 | 11/1958 | Morse . |
| 3,016,062 | 1/1962 | Zinniger . |
| 3,021,869 | 2/1962 | Ross . |
| 3,052,445 | 9/1962 | Kessler . |
| 3,072,059 | 1/1963 | Heffel . |
| 3,131,716 | 5/1964 | Griswold et al. . |
| 3,134,405 | 5/1964 | White et al. . |
| 3,139,907 | 7/1964 | Jones . |
| 3,148,254 | 9/1964 | Clason . |
| 3,148,695 | 9/1964 | Groen, Jr. et al. . |
| 3,228,652 | 1/1966 | Antrim . |
| 3,233,865 | 2/1966 | Panzica et al. . |
| 3,251,419 | 5/1966 | Howard . |
| 3,273,595 | 9/1966 | Novak . |
| 3,308,850 | 3/1967 | Gill . |
| 3,314,643 | 4/1967 | Sachnik . |
| 3,344,247 | 9/1967 | Kmiecik . |
| 3,344,808 | 10/1967 | Cary . |
| 3,345,032 | 10/1967 | Rawstron . |
| 3,347,516 | 10/1967 | Linde . |
| 3,352,155 | 11/1967 | Penet . |
| 3,354,716 | 11/1967 | Wiebe et al. . |
| 3,360,621 | 12/1967 | Liddell . |
| 3,379,410 | 4/1968 | Stewart, Jr. . |
| 3,385,318 | 5/1968 | Kilbourn . |
| 3,386,461 | 6/1968 | Fisher . |
| 3,517,554 | 6/1970 | Smith . |
| 3,525,363 | 8/1970 | Gore et al. . |
| 3,526,249 | 9/1970 | Baustian . |
| 3,567,176 | 3/1971 | Johnson . |
| 3,604,631 | 9/1971 | Etter . |
| 3,674,238 | 7/1972 | Pickles et al. . |
| 3,817,097 | 6/1974 | Heroux . |
| 3,851,665 | 12/1974 | Coughlin . |
| 3,854,497 | 12/1974 | Rosenberg . |
| 3,860,032 | 1/1975 | Rogers . |
| 3,939,871 | 2/1976 | Dickson . |
| 3,986,397 | 10/1976 | Perreault . |
| 4,041,891 | 8/1977 | Rosaen . |
| 4,108,207 | 8/1978 | Doody . |
| 4,130,128 | 12/1978 | Kaneko . |
| 4,143,255 | 3/1979 | Herscovitz . |
| 4,177,832 | 12/1979 | Price . |
| 4,187,872 | 2/1980 | Freeman et al. . |
| 4,208,033 | 6/1980 | Kesterman . |
| 4,230,154 | 10/1980 | Kalbfleish . |
| 4,244,393 | 1/1981 | Lehtinen . |
| 4,273,152 | 6/1981 | Freeman . |
| 4,399,977 | 8/1983 | Wheatley . |
| 4,530,375 | 7/1985 | Bey . |
| 4,575,262 | 3/1986 | Andersen . |
| 4,643,224 | 2/1987 | Rung ................................... 137/559 |
| 4,655,078 | 4/1987 | Johnson . |
| 4,657,222 | 4/1987 | Tullio . |
| 4,662,394 | 5/1987 | Williams . |
| 4,704,983 | 11/1987 | Rung ................................... 137/559 |
| 4,729,403 | 3/1988 | Roche ................................. 137/559 |
| 4,739,794 | 4/1988 | Ballun . |
| 4,741,361 | 5/1988 | McHugh . |
| 4,782,333 | 11/1988 | Merchant . |
| 4,796,858 | 1/1989 | Kabel . |
| 4,848,401 | 7/1989 | Devilleger et al. . |
| 4,852,610 | 8/1989 | McHugh . |
| 4,971,109 | 11/1990 | McHugh . |
| 4,993,453 | 2/1991 | McHugh . |
| 4,995,423 | 2/1991 | McHugh . |
| 5,103,862 | 4/1992 | McHugh . |
| 5,269,344 | 12/1993 | McHugh . |
| 5,406,979 | 4/1995 | McHugh . |
| 5,588,462 | 12/1996 | McHugh . |
| 6,074,176 * | 6/2000 | Conkin et al. ................... 137/100 X |
| 6,076,545 * | 6/2000 | Cooper ............................ 137/552 X |

* cited by examiner

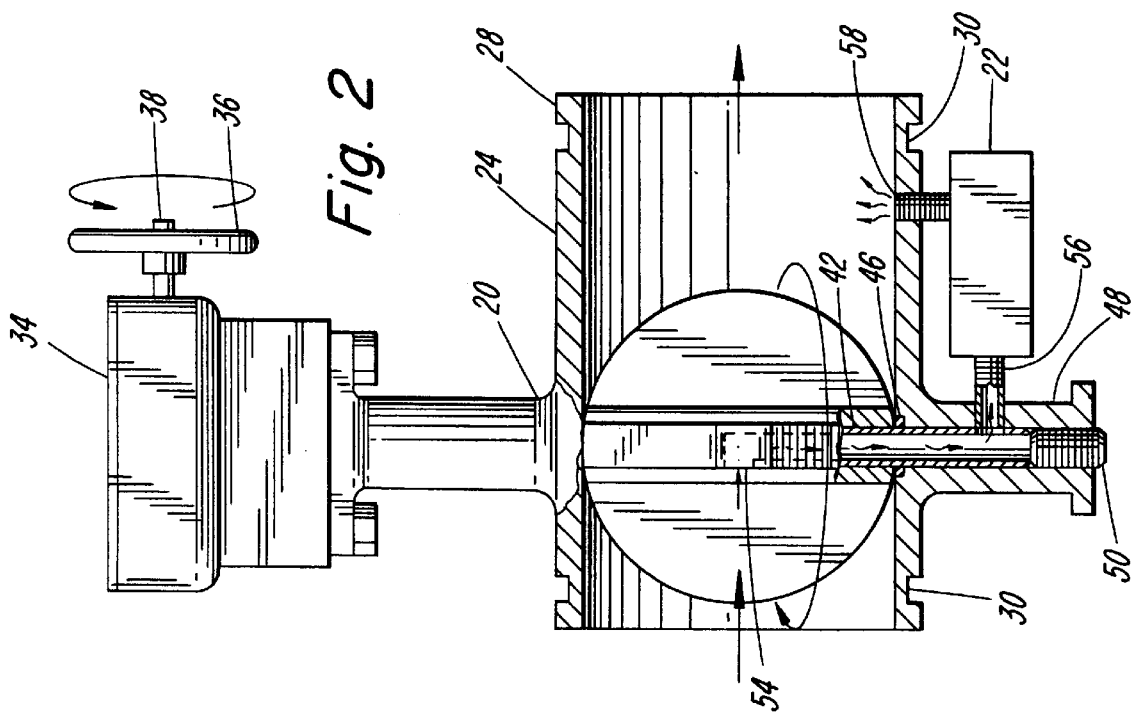
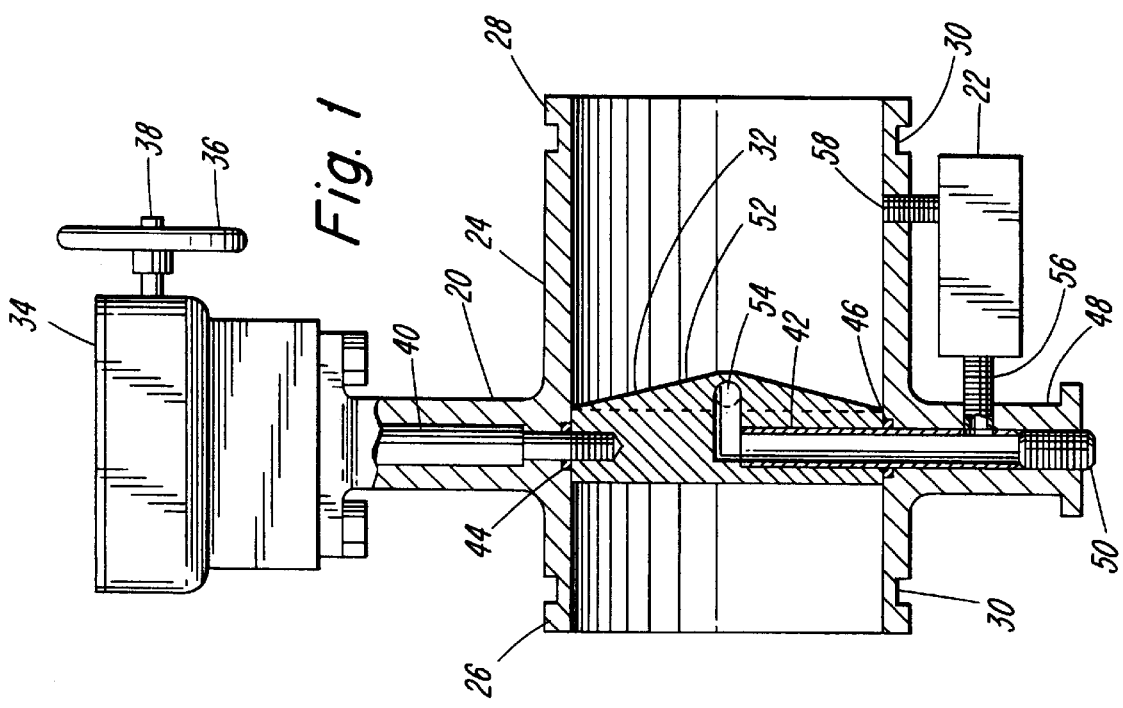

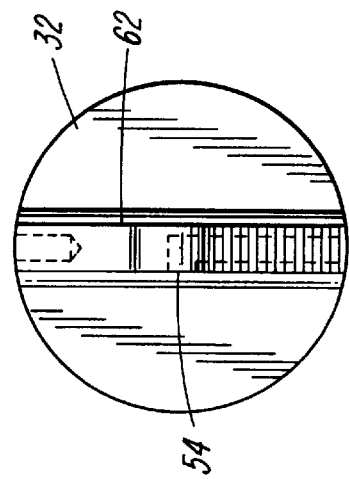
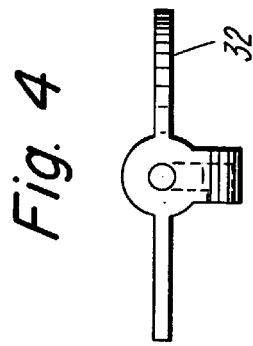
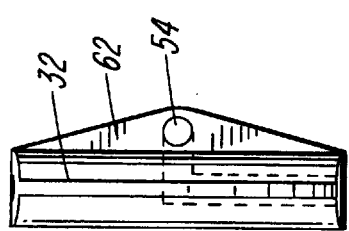
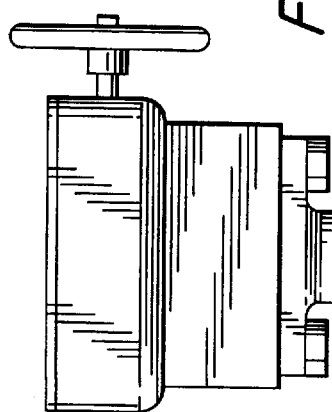
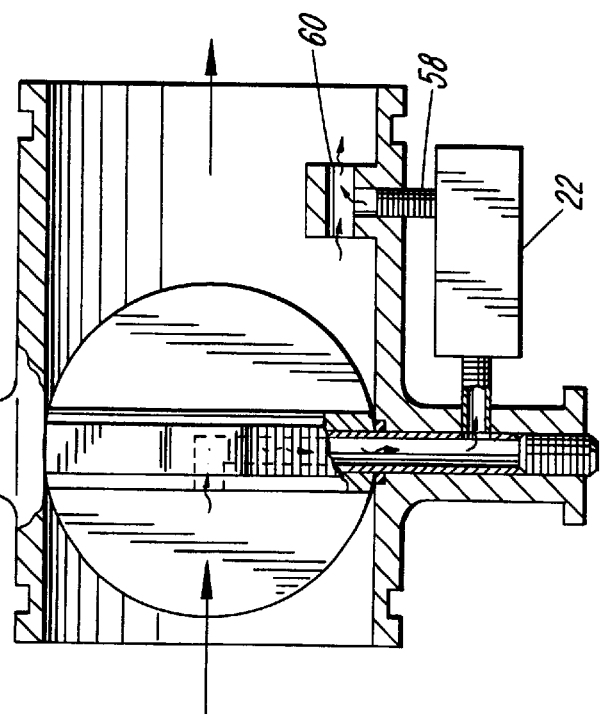

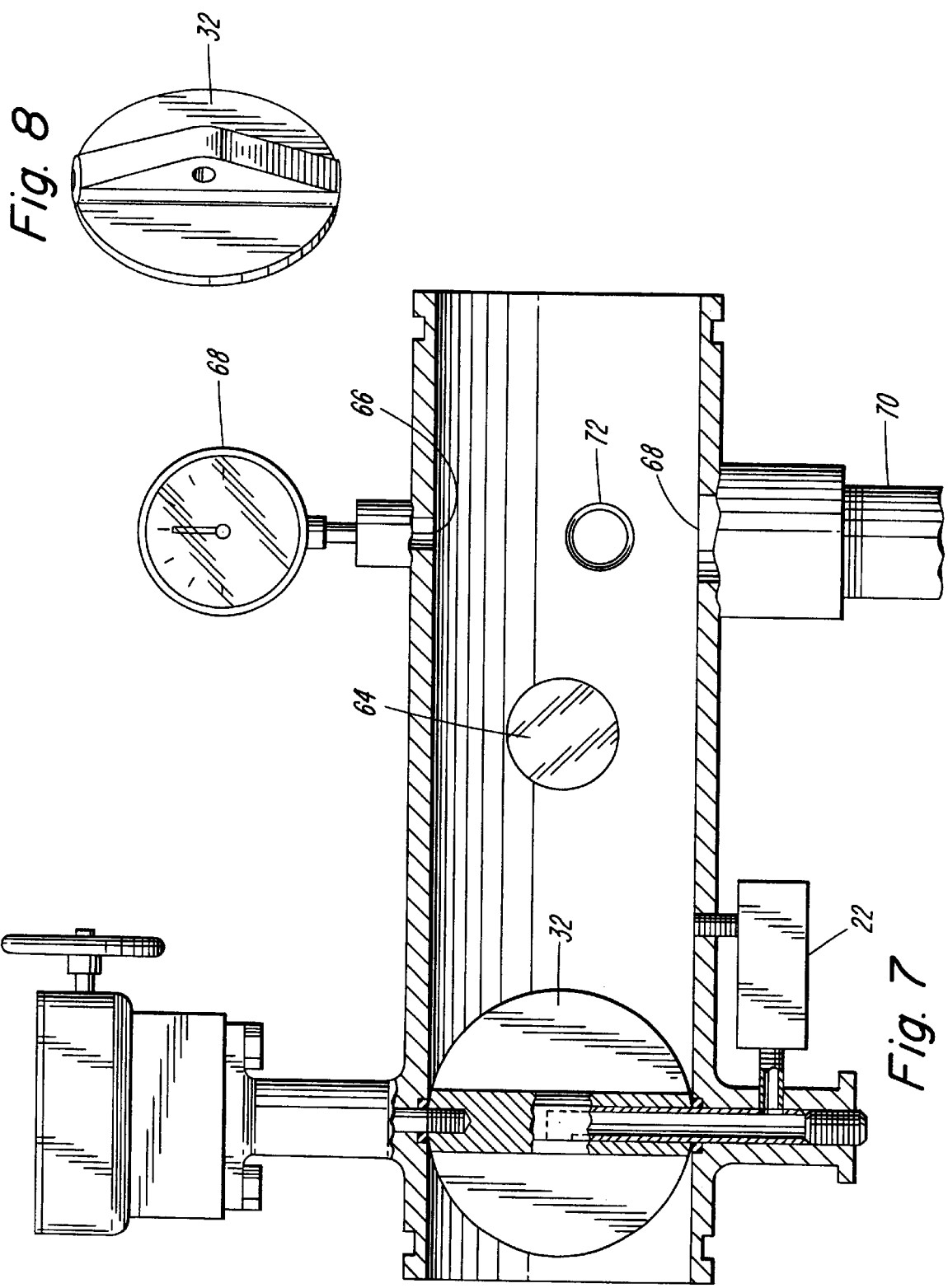

VALVE WITH INTEGRAL FLOW SWITCH

BACKGROUND AND SUMMARY OF THE PRESENT INVENTION

The present invention relates generally to valves and more particularly relates to butterfly valves and flow switches especially for use in a fire suppression system.

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers will not result in a flow of water through the fitting for the water sprinkler. Accordingly, it is conventional in the art to provide a valve which controls the flow of water to the arrangement of individual water sprinklers.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested.

The use of a separate control valve and flow switch results in significant time and expense during the installation of such plumbing.

Accordingly, it is an object of the present invention to provide a valve having an integral flow switch.

Yet another object of the present invention is to provide a butterfly valve and flow switch especially for a fire suppression water sprinkler system.

Still another object of the present invention is to provide a butterfly valve and flow switch which is relatively simple and easy to install and use.

These and other objects are accomplished by a valve and flow switch according to the present invention.

The valve and flow switch according to the present invention comprises a valve housing having an inlet and an outlet. A valve member is mounted for movement about an axis of rotation between an open position in which the disk permits flow from the inlet to the outlet and a closed position in which the disk prevents flow from the inlet to the outlet. A passageway is provided from one side of the disk to an inlet of a flow switch with an outlet of the flow switch communicating with the outlet of the valve.

In the preferred embodiment of the present invention, the valve is a butterfly valve with the valve member being a disk. The passageway has an inlet which is provided on a side of the disk which is facing toward the outlet of the valve when the disk is in the closed position. In addition, the passageway preferably is provided along the axis of rotation of the disk. If desired, the outlet of the flow switch may have an arrangement to provide a relatively low pressure at the outlet of the flow switch in order to facilitate flow through the flow switch. In addition, a port may be provided in the outlet of the valve to receive a pressure gauge. If desired, one or more sight glasses may be provided in the outlet of the valve and a tapping may be provided to receive an inlet of a pressure relief valve.

In operation, when the disk is in the closed position, communication is prevented between the inlet of the valve and the outlet of the valve. No flow is permitted into the passageway from the inlet of the valve when the disk is in the closed position. When the disk is moved to the open position, communication is permitted between the inlet and the outlet and flow is also permitted from the inlet of the valve into the inlet of the passageway leading to the flow switch.

When there is no flow from the inlet of the valve to the outlet, there will be no flow from the inlet of the passageway through the flow switch. When there is a flow from the inlet to the outlet of the valve, there will also be a flow through the passageway to the flow switch and back to the outlet of the valve and the flow switch will signal that a flow is occurring through the valve.

BRIEF DESCRIPTION OF THE DRAWINGS

Preferred embodiments of the present invention will be described in greater detail with reference to the accompanying drawings, wherein like members bear like reference numerals and wherein:

FIG. 1 is a side view in cross section of a butterfly valve and flow switch according to the present invention with the valve in the closed position;

FIG. 2 is side view in cross section of the butterfly valve and flow switch of FIG. 1 with the valve in the open position;

FIG. 3 is a side view in cross-section of another butterfly valve and flow switch according to the present invention;

FIG. 4 is a top view of the valve member of the valve of FIG. 1;

FIG. 5 is an end view of the valve member of FIG. 4;

FIG. 6 is a side view of the valve member of FIG. 4;

FIG. 7 is a side view in cross section of another butterfly valve and flow switch according to the present invention;

FIG. 8 is a perspective view of the valve member of FIG. 4; and,

DETAILED DESCRIPTION OF THE PREFERRED EMBODIMENTS

Figure 9:
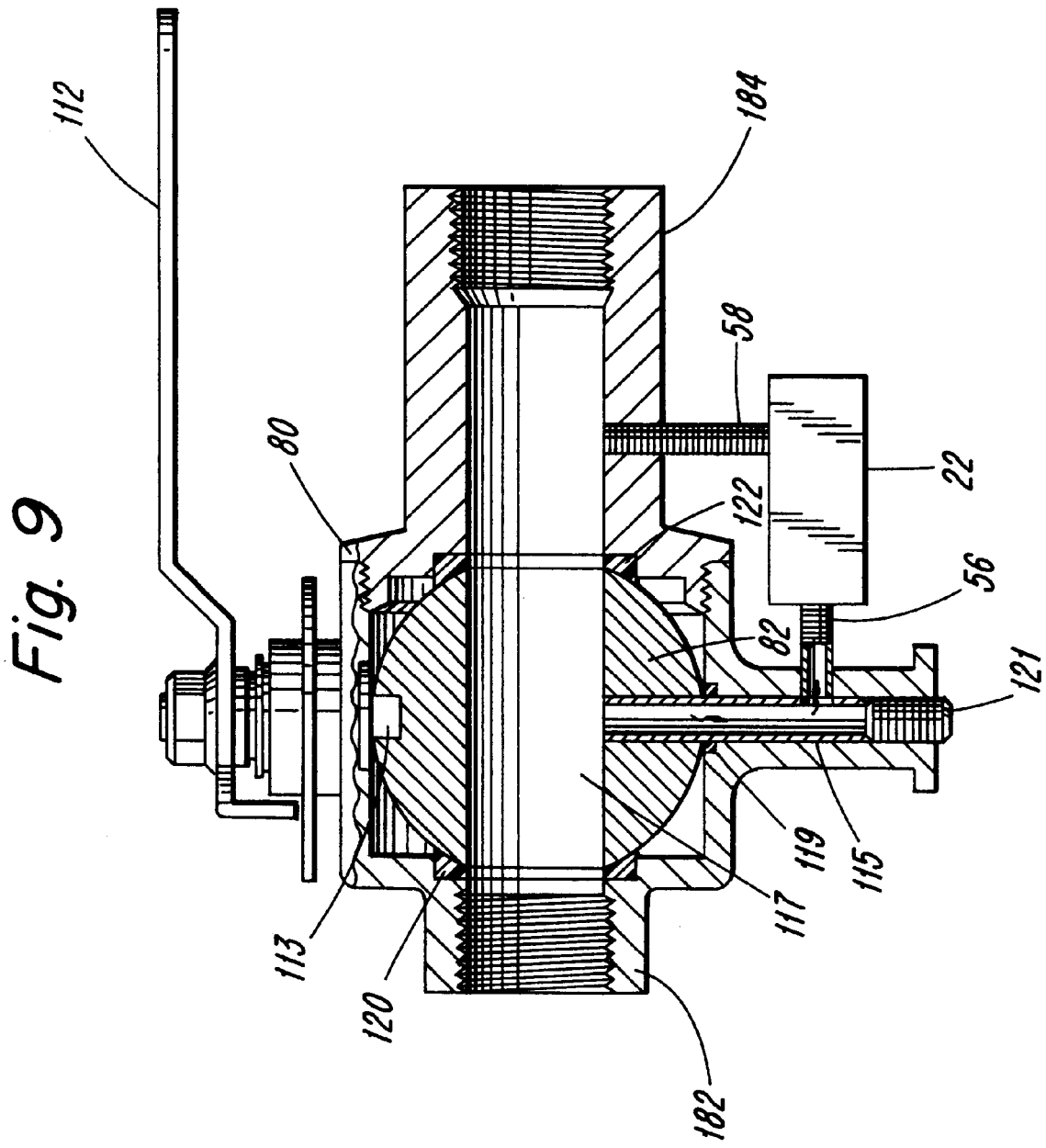
FIG. 9 is a side view in cross section of another valve and flow switch according to the present invention.

With reference to FIG. 1, a butterfly valve 20 is provided with an integral flow switch 22. The butterfly valve may be of any suitable, conventional type such as the Series 708-W Butterfly Valve of Victaulic. The flow switch 22 is also of any suitable, conventional design and is preferably a "bypass flow switch" such as the KIP 1000 Series Compact Flow Switch.

The butterfly valve 20 has a housing 24 which includes an inlet 26 and an outlet 28. Preferably, the inlet 26 and the outlet 28 are provided with grooves 30 to facilitate connection of the inlet and outlet to other fittings in a plumbing assembly. As desired, the inlet and outlet could also be provided with threaded ends or with any other suitable and conventional arrangement for connection to another plumbing fitting so long as the valve housing has sufficient length to accommodate the outlet for the flow switch 22.

In the preferred embodiment, the valve housing 24 has an opening extending from the inlet 26 to the outlet 28 with a uniform cross section of a circular configuration. A valve member 32 comprises a disk which is provided within the opening extending from the inlet 26 to the outlet 28. The disk has an outer configuration corresponding to the inner configuration of the opening so that the disk may be received snugly within the opening to thereby prevent communication between the inlet 26 and the outlet 28. As desired, the outer periphery of the valve member 32 may be provided with a resilient member (not shown) or with any suitable, conventional arrangement to facilitate a sealing relationship between the valve member 32 and the inner configuration of the opening.

The valve member 32 is mounted for rotation about an axis extending through the valve member. A valve operator 34 is provided above the valve member 32 to move the valve member 32 between a closed position (as shown in FIG. 1) and an open position (as shown in FIG. 2). In the closed position, the valve member 32 prevents communication between the inlet 26 and the outlet 28. The valve operator 34 includes a handle 36 which enables the valve member 32 to be moved manually between the open position and the closed position by rotating the handle 36. A gear arrangement (not shown) is provided between a shaft 38 carrying the handle 36 and a shaft 40 which engages the valve member 32.

The shaft 40 is fixedly mounted with respect to the valve member 32 so that the valve member 32 rotates with the rotation of the shaft 40. Preferably, the gear ratio between the handle 36 and the shaft 40 is such that the valve member 32 closes slowly and avoids "water hammer" from a too rapid opening or closing of a valve.

If desired, and if permitted by the applicable codes and regulations, the valve operator 34 may be motorized or otherwise mechanically driven by a motor (not shown) or by some other arrangement. Preferably, the valve operator 34 includes internal stops (not shown) so that the valve member 32 may not be moved beyond the open position and may not be moved beyond the closed position. If desired, the valve operator 34 may also have an indicator to visually show that the valve member 32 is in the fully open position or in the fully closed position.

The valve member 32 is carried on a lower shaft 42 which comprises an open tube or pipe. The valve member 32 is free to pivot about the lower shaft 42 between the open position and the closed position. If desired, packing or sealing material 44 such as an "o-ring" may be provided about the shaft 40 between the valve member 32 and the valve housing to prevent or reduce leakage from the valve. A similar packing or sealing material 46 may be provided about the lower shaft 42 between the valve member 32 and the valve housing.

The lower shaft 42 is provided within a member 48 which is preferably formed integrally in the housing of the valve. A set screw 50 or another closure member may be provided at the outer end of the member 48 to maintain the lower shaft in position and to seal the end of the lower shaft 42.

The valve member 32 is provided with a raised portion 52 which extends toward the outlet of the valve when the valve member 32 is in the closed position. The raised portion 52 includes an opening 54 which communicates with the interior of the valve housing and which extends inwardly to the axis of rotation of the valve member 32.

With reference to FIG. 2, when the handle 36 has been rotated to move the valve member 32 to the open position, the opening 54 is directed toward the inlet 26 of the valve housing and is in communication with the inlet of the valve. If there is a flow from the inlet of the valve to the outlet of the valve, a portion of the flow will enter the opening 54 and pass through the valve member 32 to the inner portion of the valve member where the flow may enter and pass through the lower shaft 42.

The opening 54 is provided on the side of the valve member 32 which faces the outlet of the valve (when the valve member is in the closed position) so that the opening 54 is not in communication with the inlet of the valve when the valve member is in the closed position. If the opening 54 were in communication with the inlet of the valve housing when the valve member 32 were in the closed position, flow through the flow switch could occur and the valve could not be completely shut. If desired, another arrangement could be provided for stopping a flow through the flow switch when the valve member 32 is in the closed position. For example, the lower shaft 42 could extend upwardly beyond the opening 54 with a hole provided in the lower shaft to align with the opening 54 when the valve member 32 is in the open position. In this arrangement (not shown), the opening 54 would not be in communication with the flow switch 22 through the lower shaft 42 when the valve member 32 is in the fully closed position.

The outlet of the lower shaft is in communication with an inlet of the flow switch 22 through a pipe 56. An outlet of the flow switch 22 is in communication with the outlet 28 of the valve housing through a pipe 58. In this way, when the valve member is in the open position and there is a flow through the valve from the inlet 26 to the outlet 28, there will also be a flow through the opening 54, then through the lower shaft 42 to the flow switch 22 through the pipe 56 and then back into the valve through the pipe 58. In this way, the flow switch 22 may sense a flow through the valve when the valve member 32 is in the open position.

With reference now to FIG. 3, the pipe 58 at the outlet of the flow switch 22 may be provided with a siphon arrangement whereby the pressure at the outlet of the pipe 58 is at a lower pressure than the inlet 54. In this way, flow through the flow switch may be enhanced and the ability of the flow switch to detect a flow through the valve may be increased. The siphon arrangement includes a passageway 60 extending perpendicularly to the outlet of the pipe 58 but colinear with the flow through the valve housing. In this way, when there is a flow through the valve housing there will also be a flow through the passageway 60. The flow of water or other fluid through the passageway 60 tends to create a relatively low pressure above the outlet of the pipe 58 to "siphon" or urge the water to flow upwardly in the pipe 58. This siphoning in turn causes the flow through the inlet 54 and through the lower shaft 42 to likewise increase with the result that additional flow through the flow switch 22 is provided.

An alternative siphoning arrangement for the outlet of the pipe 58 (not shown) includes a 90 degree elbow which extends into the outlet portion of the valve housing from the outlet of the pipe 58. The outlet of the 90 degree elbow is directed toward the outlet of the valve so that the flow of water around the outlet of the 90 degree elbow again creates a relatively low pressure at the outlet of the 90 degree elbow to pull water through the flow switch from the inlet 54.

With reference now to FIG. 4, the valve member 32 preferably has a disk shape in cross section with a middle portion of the disk along the axis of rotation thickened in order to accommodate the shaft 40 (to move the disk) and the lower shaft 42 to carry the disk and to provide a passageway for the water from the inlet 54. Because the opening 54 is preferably located in the center of the disk of the valve member 32, the opening 54 is unlikely to receive solids that have precipitated out of the water. If the opening for the flow switch 22 were located at the bottom of the valve, for example, rust particles or any other solid particles that have precipitated out of the water or other liquid in the valve may tend to enter the opening and possibly block or obstruct a flow through the flow switch 22. Accordingly, the flow switch 22 may be positioned at any location about the valve housing with the inlet 54 preferably centrally located in the valve member.

With reference to FIG. 5, a generally triangular member 62 may be provided along the axis of rotation in order to provide additional strength to the disk and to accommodate the inlet 54 (see also FIG. 6 and FIG. 8).

With reference to FIG. 7, if desired, the valve housing may be elongated in order to enable one or more sight glasses 64 to be provided. The sight glasses enable a visual inspection or observation of a flow through the valve housing. In addition, a port 66 may be provided to permit a pressure gauge 68 to be provided in fluid communication with the outlet of the valve housing. If desired, another port 68 may be provided to communicate with a test and drain valve (not shown) through a pipe 70. Finally, another port 72 may be provided to communicate with an inlet of a pressure relief valve (not shown) with the outlet of the pressure relief valve preferably directed to a drain.

In operation, when the valve member 32 is in the closed position, flow between the inlet and the outlet of the valve is blocked. Likewise, when the valve member 32 is in the closed position, flow into the flow switch 22 is likewise blocked. When the valve member 32 is moved to the open position, flow between the inlet and the outlet is permitted. However, if there is no opening downstream of the valve outlet, there may still be no flow through the valve. When flow does occur from the inlet to the outlet of the valve, flow will also occur through the opening 54 through the flow switch and back into the valve housing.

With reference now to FIG. 9, a ball valve 80 according to the present invention includes a housing having an inlet 182 and an outlet 184. The ball valve includes a valve member 82 comprising a ball having a passageway 117 extending through the ball. The ball is provided within the valve housing with a valve seal 122 provided on the downstream side of the ball. A valve seat 120 is provided on the upstream side of the ball.

A valve actuator 132 includes a handle which is connected to a shaft 113 that is received within a slot in the ball 82. Rotation of the handle causes the ball 82 to move about a vertical axis.

A lower shaft 115 extends through the valve housing and through an opening provided in the lower portion of the ball. If desired, packing or an O-ring 119 may be provided between the housing and the lower shaft to prevent leakage from the valve.

In order to facilitate assembly, the lower shaft 115 may be inserted into the ball valve member after the ball has been positioned in the valve housing. The lower shaft 115 may then be maintained in place by a retaining member such as a set screw 121.

As described in connection with the other embodiments, above, the lower shaft 115 is hollow and communicates with a flow switch 22 through a pipe 56. An outlet of the flow switch 22 is directed into the outlet of the valve through another pipe 58.

Other valve arrangements such as a plug valve, may be readily adapted according to the present invention to provide an integral flow switch.

In operation, when the handle 112 is moved to a closed position, the ball prevents a flow from the inlet of the valve to the outlet. Accordingly, flow is also prevented from the inlet to the flow switch 22. When the handle 112 is moved to the open position, the passageway 117 is aligned with the inlet and the outlet of the valve and flow is also permitted to occur from the inlet to the passageway in the lower shatf 115 and then into the flow switch and back to the outlet of the valve.

While the valve and flow switch according to the present invention have been described with references to a fire suppression water sprinkler system, it is expected that the butterfly valve and flow switch may be of general utility in systems other than water sprinkler systems. Accordingly, the principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. A valve and flow switch arrangement, comprising:
   a housing defining an interior chamber having an inlet and an outlet;
   valve means for controlling a flow between the inlet and the outlet including a valve member which is movable to an open position in which flow is permitted between the inlet and the outlet and which is movable to a closed position in which flow is blocked between the inlet and the outlet;
   flow switch means for detecting a flow through said valve;
   means for providing communication between the valve inlet and an inlet of the flow switch means when said valve member is in said open position; and
   means for providing communication between the valve outlet and an outlet of the flow switch means.

2. The valve of claim 1 wherein said inlet and said outlet are generally colinear with one another.

3. The valve of claim 1 wherein said valve member comprises a disk which is rotatable about an axis.

4. The valve of claim 3 wherein said means for providing communication between the valve inlet and an inlet of the flow switch means when said valve member is in said open position comprises an opening provided in said disk.

5. The valve of claim 4 wherein said opening provided in said disk is directed toward said outlet of said valve housing when said valve member is in said closed position.

6. The valve of claim 5 wherein said disk rotates about a hollow shaft and wherein said opening in said disk is in communication with said hollow shaft.

7. The valve of claim 6 wherein said flow switch means includes a flow switch having an inlet and an outlet and wherein said hollow shaft is in communication with the inlet of said flow switch means.

8. The valve of claim 7 wherein said outlet of said flow switch is in communication with the outlet of the valve housing.

9. The valve of claim 8 wherein said outlet of said flow switch includes means for reducing the pressure at said outlet of said flow switch when there is a flow through the valve housing.

10. The valve of claim 1 wherein said outlet of said valve housing includes at least one sight glass to permit a visual inspection of a flow through the valve.

11. The valve of claim 1 wherein said outlet of said valve housing includes a port to provide communication with a pressure gauge.

12. The valve of claim 1 wherein each of said inlet and said outlet of said valve housing includes means for facilitating connection to another plumbing fitting.

13. The valve of claim 1 wherein said valve member comprises a ball which is rotatable about an axis.

14. The valve of claim 13 wherein said means for providing communication between the valve inlet and an inlet of the flow switch means when said valve member is in said open position comprises an opening provided in said ball.

15. The valve of claim 14 wherein said opening provided in said ball is not in communication with said inlet of said valve housing when said valve member is in said closed position.

16. The valve of claim 15 wherein said ball rotates about a hollow shaft and wherein said opening in said ball is in communication with said hollow shaft.

17. The valve of claim 16 wherein said flow switch means includes a flow switch having an inlet and an outlet and wherein said hollow shaft is in communication with the inlet of said flow switch means.

18. The valve of claim 17 wherein said outlet of said flow switch is in communication with the outlet of the valve housing.

19. The valve of claim 18 wherein said outlet of said flow switch includes means for reducing the pressure at said outlet of said flow switch when there is a flow through the valve housing.

20. A butterfly valve and flow switch arrangement, comprising:

a housing defining an interior chamber having an inlet and an outlet;

valve means for controlling a flow between the inlet and the outlet including a valve member which comprises a disk which is movable about an axis of rotation to an open position in which flow is permitted between the inlet and the outlet and which is movable about the axis of rotation to a closed position in which flow is blocked between the inlet and the outlet;

means for moving said disk to said open position and to said closed position;

a flow switch having an inlet and an outlet;

means for providing communication between the valve inlet and the inlet of the flow switch when said disk is in said open position; and means for providing communication between the valve outlet and the outlet of the flow switch.

21. The valve of claim 20 wherein said inlet and said outlet of the valve housing are generally colinear with one another.

22. The valve of claim 20 wherein said means for providing communication between the valve inlet and the inlet of the flow switch when said valve member is in said open position comprises an opening provided in said disk.

23. The valve of claim 22 wherein said opening provided in said disk is directed toward said outlet of said valve housing when said valve member is in said closed position.

24. The valve of claim 23 wherein said disk rotates about a hollow shaft and wherein said opening in said disk is in communication with said hollow shaft.

25. The valve of claim 24 wherein said hollow shaft is in communication with the inlet of said flow switch.

26. The valve of claim 25 wherein said outlet of said flow switch includes means for reducing the pressure at said outlet of said flow switch when there is a flow through the valve housing.

27. The valve of claim 26 wherein said outlet of said valve housing includes at least one sight glass to permit a visual inspection of a flow through the valve.

28. The valve of claim 26 wherein said outlet of said valve housing includes a port to provide communication with a pressure gauge.

29. The valve of claim 26 wherein each of said inlet and said outlet of said valve housing includes means for facilitating connection to another plumbing fitting.

* * * * *